F. KOVACS.
COMBINED COOP AND TRAP.
APPLICATION FILED JAN. 9, 1912.
1,064,347.
Patented June 10, 1913.
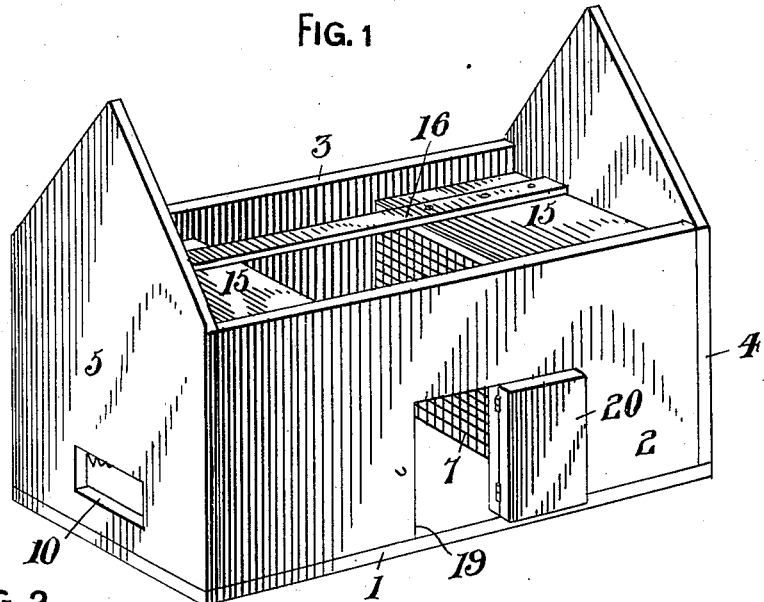
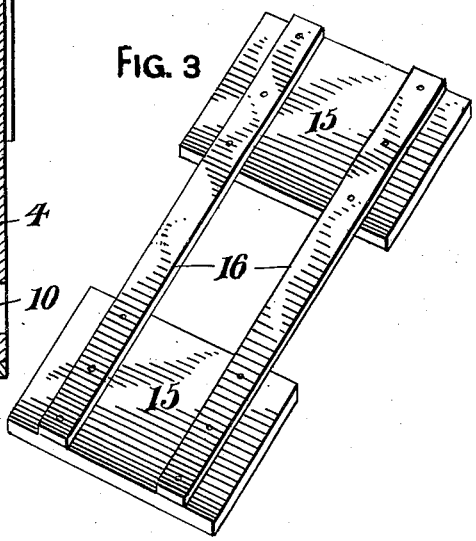

UNITED STATES PATENT OFFICE.

FRANK KOVACS, OF BEDFORD, OHIO.

COMBINED COOP AND TRAP.

1,064,347. Specification of Letters Patent. Patented June 10, 1913.

Application filed January 9, 1912. Serial No. 670,265.

*To all whom it may concern:*

Be it known that I, FRANK KOVACS, a subject of the King of Hungary, residing at Bedford, in the county of Cuyahoga and State of Ohio, have invented certain new and useful Improvements in Combined Coops and Traps, of which the following is a specification, reference being had therein to the accompanying drawing.

This invention relates to a combined coop and trap, and my invention aims to provide a chicken coop with traps for entrapping animals that are enticed to the coop by the chickens or contents thereof.

My invention further aims to provide a coop and trap that is simple in construction, durable and easy to maintain in a sanitary condition.

The invention aims to accomplish the above results by a combination of mechanical elements that will be hereinafter specifically described and then claimed.

Reference will now be had to the drawing, wherein:—

Figure 1 is a perspective view of the coop and trap with the roof thereof removed, Fig. 2 is a longitudinal sectional view of the coop and trap, and Fig. 3 is a perspective view of a detached roost.

A coop and trap in accordance with this invention comprises a base plate 1, side walls 2 and 3, end walls 4 and 5 and a gable roof 6 that is detachably supported by the end walls 4 and 5 and the upper edges of the side walls 2 and 3, whereby said roof can be removed and the interior of the coop and trap thoroughly cleaned. The elements 1 to 6 inclusive constitute a housing and in the ends of the housing are located trap compartments.

The inner sides of the walls 2 and 3 are connected, adjacent to the ends thereof, by transverse screens 7 and these screens are preferably made of interwoven wire. The screens have the lower edges thereof secured, as at 8 to the base plate 1 and these screens coöperate with the end walls 4 and 5 in providing trap compartments 9. The end walls 4 and 5 are provided with openings 10 and the inner sides of said end walls, adjacent to the openings 10, are provided with inwardly projecting ledges 11 upon which normally rest gravity trap doors 12 that are hinged or pivotally connected, as at 13 to the inner sides of the walls 4 and 5. The inner sides of the walls 4 and 5 have transverse cleats 14 and upon these cleats rest end plates 15 connected by longitudinal bars 16, said end plates and said bar constituting a roost for chickens. The end plates 15 fit between the walls 2 and 3, 4 and 5 and the upper edges of the screens 7, thereby closing the top of the trap compartments. The roost bars 16 are provided with hooks 17 to engage eyes 18 carried by the upper edges of the screens 7, whereby the roosts cannot be accidentally displaced by an animal within the trap compartments 9. The side wall 2 has a doorway 19 and a hinged door 20, which can be provided with a suitable lock or latch (not shown).

Chickens can easily enter the door way 9 to roost in the top part of the coop and when the door 20 is closed, an animal cannot enter the chicken compartment of the coop, but an animal can enter the opening 10, elevate the trap door 12 and enter one of the compartments 9. After the animal has entered the compartment it is impossible for the animal to escape.

The coop and trap is preferably made of wood, with the exception of the screens 7, ledges 11 and trap doors 12.

What I claim is:—

A combined coop and trap comprising a receptacle including side and end walls, a closed bottom and an open top, transverse screens having their ends secured to said side walls and their lower edges secured to the bottom, said screens of less height than the height of said end walls and providing said receptacle with a pair of end and intermediate compartments, said end walls formed with entrance openings for said end compartments, doors carried by the inner faces of the end walls and associated with said openings, one of said side walls provided with an entrance opening for said intermediate compartment, transversely extending cleats secured to the inner faces of the end walls above the openings thereof and having their upper faces in alinement with the top edges of said screens, spaced plates mounted upon the top edges of the screens and cleats and forming the tops of said end compartments, longitudinally extending spaced rest bars mounted upon and having their end portions fixedly secured to the upper faces of said plates, eyes carried by the top of said screens, and hooks carried by said bars and engaging in said eyes for locking said bars and plates relatively to said screens.

In testimony whereof I affix my signature in the presence of two witnesses.

FRANK KOVACS.

Witnesses:
 ALEXANDER WEIZER,
 JOS. L. TOKESKY.

Copies of this patent may be obtained for five cents each, by addressing the "Commissioner of Patents, Washington, D. C."